US006262515B1

(12) United States Patent
Yerganian

(10) Patent No.: US 6,262,515 B1
(45) Date of Patent: Jul. 17, 2001

(54) PIEZOELECTRIC WAVE MOTOR

(75) Inventor: Simon Scott Yerganian, Lee's Summit, MO (US)

(73) Assignee: Honeywell International, Inc., Morris County, NJ (US)

( * ) Notice: Subject to any disclaimer, the term of this patent is extended or adjusted under 35 U.S.C. 154(b) by 0 days.

(21) Appl. No.: 09/507,527

(22) Filed: Feb. 18, 2000

(51) Int. Cl.[7] ...................................................... H02N 2/12
(52) U.S. Cl. .............................. 310/323.06; 310/323.04
(58) Field of Search ........................ 310/323.01, 323.03, 310/323.04, 323.05, 323.06, 323.02, 328

(56) References Cited

U.S. PATENT DOCUMENTS

| 4,513,219 | 4/1985 | Katsuma et al. | 310/328 |
|---|---|---|---|
| 4,562,374 | 12/1985 | Sashida | 310/328 |
| 4,736,129 | 4/1988 | Endo et al. | 310/323 |
| 4,743,792 | 5/1988 | Ueyama | 310/328 |
| 4,755,705 | * 7/1988 | Holum | 310/328 |
| 5,172,023 | 12/1992 | Kawai et al. | 310/323 |
| 5,648,696 | 7/1997 | Le Letty et al. | 310/323 |
| 5,719,462 | 2/1998 | Takagi | 310/323 |
| 5,780,956 | * 7/1998 | Oliver et al. | 310/323.04 |

FOREIGN PATENT DOCUMENTS 64-43076 * 2/1989 (JP) ................................ 310/323.05

* cited by examiner

Primary Examiner—Thomas M. Dougherty
(74) Attorney, Agent, or Firm—Hovey, Williams, Timmons & Collins

(57) ABSTRACT

A piezoelectric motor having a stator in which piezoelectric elements are contained in slots formed in the stator transverse to the desired wave motion. When an electric field is imposed on the elements, deformation of the elements imposes a force perpendicular to the sides of the slot, deforming the stator. Appropriate frequency and phase shifting of the electric field will produce a wave in the stator and motion in a rotor. In a preferred aspect, the piezoelectric elements are configured so that deformation of the elements in direction of an imposed electric field, generally referred to as the $d_{33}$ direction, is utilized to produce wave motion in the stator. In a further aspect, the elements are compressed into the slots so as to minimize tensile stresses on the elements in use.

1 Claim, 6 Drawing Sheets

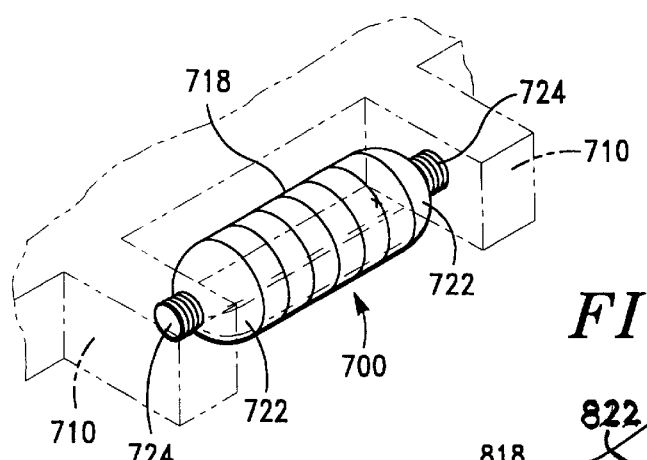
*FIG.-8*
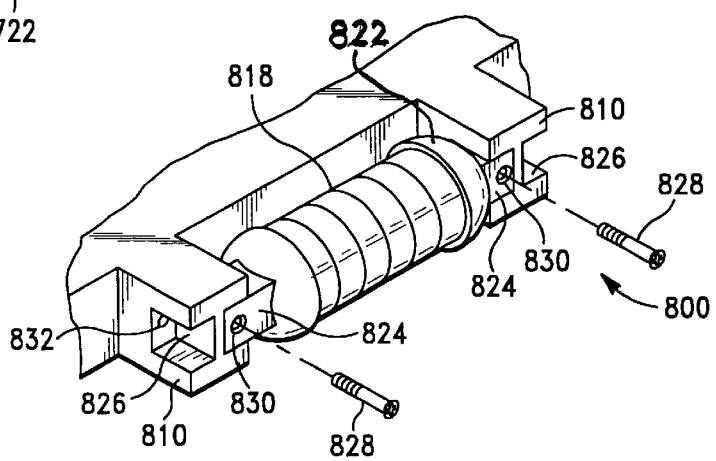
*FIG.-9*
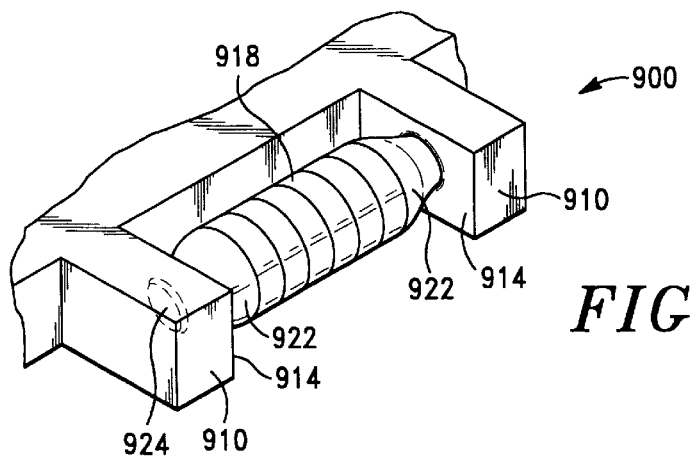
*FIG.-10*
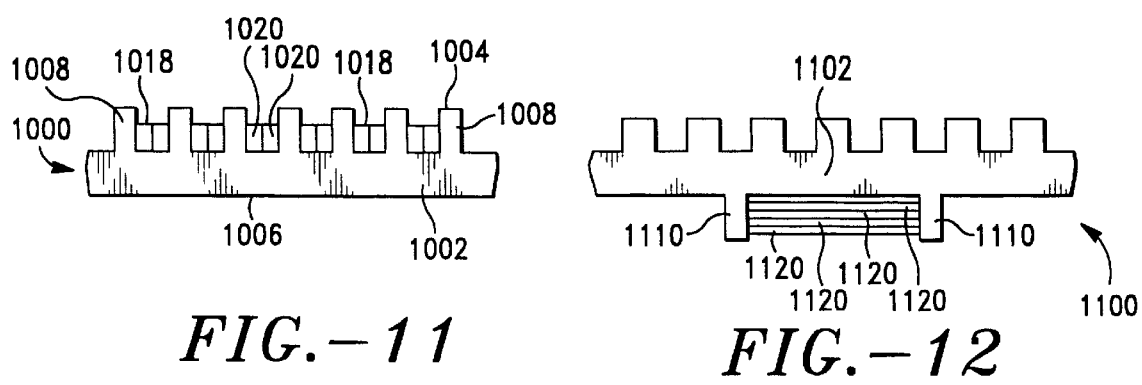
*FIG.-11*  *FIG.-12*

PIEZOELECTRIC WAVE MOTOR

The United States Government has rights in this invention pursuant to contract number DE-AC04-76-DP00613 with the United States Department of Energy.

BACKGROUND OF THE INVENTION

1. Field of the Invention

The present invention relates to piezoelectric motors. More particularly, the present invention relates to a unique configuration for mounting piezoelectric elements in a piezoelectric wave motor.

2. Description of Related Art

Piezoelectric motors are utilized in a wide variety of applications in modern society, such as autofocusing camera lenses and automatic control units for window blinds. Piezoelectric motors are particularly well-suited for any application which requires a motor having a compact size (e.g. as small as the size of a fingertip), quiet operation, high torques at low speeds, quick response, and/or which is not effected by magnetic fields.

A typical design of an existing piezoelectric motor is shown in FIG. 1 designated by reference numeral 10. Motor 10 is a rotary motor that includes a disk-shaped stator 12 having a comb-tooth top surface 14 and a flat bottom surface 16. Motor 10 also includes a thin piezoelectric ring 18, which is bonded to bottom surface 16 of stator 12 with an adhesive material, such as an epoxy resin. Dispersed around ring 18 are individual segments of piezoelectric ceramic which have been electrically poled in alternating opposite directions (indicated by "+" and "−") along an axis of poling which is perpendicular to the plane of stator 12.

Piezoelectric motor 10 further includes a disk-shaped rotor 20, here shown as a geared rotor, which, together with stator 12 and piezoelectric ring 18 bonded to the stator, are mounted onto a shaft 22 which extends upwardly from the center of a rigid base 24. A spring washer 26, bearing 28, and e-clip 30 function to hold rotor 20 in pressure contact with top surface 14 of stator 12. A thin friction liner 32 is placed between stator 12 and rotor 20 to reduce sliding, energy losses during the operation of motor 10. (It is known in the art to attach friction liners to rotors and further references to rotors herein will be understood to include a possible friction liner.)

A high frequency a.c. voltage drive source 34 is also provided to drive motor 10. A first electrical lead 36 supplies a first a.c. voltage signal (typically, $V_o \sin \omega t$) to a first set of poled segments on ring 18, and a second electrical lead 38 supplies a second a.c. voltage signal ($V_o \cos \omega t$) to a second set of poled segments on ring 18, which are displaced along the stator from the first set as is known in the art. A third electrical lead 40 is connected to ground.

In operation, the a.c. voltage signals from drive source 34 cause the poled segments of piezoelectric material in ring 18 to expand and contract in such a manner that a traveling wave is generated in stator 12. The comb-tooth top surface 14 of stator 12 amplifies this traveling wave, and the crests of the amplified traveling wave move in an elliptical motion such that a tangential force is created at the wave crests. As the wave crests contact rotor 20, this tangential force causes movement of rotor 20 to thereby drive motor 10.

Motor 10 has all of the desirable features which are generally associated with piezoelectric motors (e.g. compact size, quiet operation, high torques at low speeds, quick response, and not effected by magnetic fields); however, there are still several shortcomings associated with the design and operation of motor 10.

First, the expansions and contractions of the individual segments (i.e., individual piezoelectric ceramics—typically referred to as elements) of ring 18 create alternating tensile and compressive stresses in the elements. Because piezoelectric elements are ceramics, and are typically weak in tension, these alternating tension stresses promote the growth of cracks within the elements. Over time, these cracks will decrease motor reliability and may eventually lead to the failure of motor 10.

Second, motor 10 is driven by the expansions and contractions of the poled segments of piezoelectric element ring 18, which expansions and contractions are transverse to the element's axis of poling. (Expansions and contraction transverse to the piezoelectric element's axis of poling are commonly referred to as being in the "$d_{31}$ direction"). It is well known in the art that expansions and contractions parallel to the element's axis of poling (commonly referred to as the "$d_{33}$ direction") are approximately twice the magnitude of those in the $d_{31}$ direction for a given electrical field. Thus, motor 10 does not fully utilize the piezoelectric properties of the elements.

Third, in order to transmit forces to the stator 12, piezoelectric element ring 18 is directly bonded to stator 12 such that shear stress is placed on the bond as the segments of ring 18 expand and contract in such a manner that a traveling wave is generated in stator 12. Over time, this shear stress on the bond between ring 18 and stator 12 may lead to the failure of motor 10.

SUMMARY OF THE INVENTION

Accordingly, it is an object of this invention to provide a piezoelectric motor in which the mounting of the piezoelectric elements is configured to reduce operating stresses in the piezoelectric elements by reduction of tensile stresses in the elements, shear stresses in the element bond, or both. It is a further object of this invention to provide a piezoelectric motor in which deformation of piezoelectric elements in the $d_{33}$ direction may be utilized to produce motion.

In order to address these objects, the present invention utilizes a series of slots formed in the stator transverse to the desired wave motion. Piezoelectric elements are contained within these slots. Upon imposing an appropriate electric field, the elements deform, exerting forces perpendicular to the sides of the slots (i.e., in the direction of the desired wave motion). Because the elements so mounted impart forces resulting from their deformation in a direction perpendicular to the surface of the slots, shear forces imposed upon the elements are minimized or eliminated.

In a preferred aspect of the invention, piezoelectric elements contained in slots may be compressively fitted into the slots in the stator. Because the elements have an initial resting compression, the magnitude of tension experienced by these elements in operation is minimized or eliminated. Further, the elements may be compressed to such an amount that no tensile forces exist in the elements during operation.

In another preferred aspect, the piezoelectric elements contained in slots may be operated in the $d_{33}$ mode. Operation in this mode maximizes the deformation achieved from an element for a given electric field, thus maximizing relative motion of the stator.

In a further preferred aspect, the individual piezoelectric elements contained in slots are stacked together to form what will be referred to as piezoelectric stacks. As the term is used herein, a piezoelectric stack consists of a plurality of piezoelectric elements mechanically connected side-to-side, with the elements being poled and electrically connected so that when an electric field is imposed, the deformation of the stacked elements is additive. Stacking may readily be accomplished where the elements are operated in the $d_{33}$ mode so that contiguous portions of adjacent elements may be electrically connected (operated at the same potential).

In one aspect, the present invention may be a rotary piezoelectric motor having a design similar to the motor illustrated in FIG. 1, with the exception that the stator and piezoelectric element ring are replaced with a new stator and utilizing piezoelectric stack assemblies. The replacement stator and piezoelectric stack assemblies of the present invention generally comprise a stator, typically disk-shaped with a generally circular surface, the stator having a plurality of levers dispersed along and extending outwardly from the periphery of the stator surface. (As used herein, levers are projections either affixed or bonded to the stator or consist of part of the stator cut or formed into the stator material.) These levers define a plurality of slots between the levers, the slots extending along radials from the axis of the stator (i.e., transverse to the desired motion). Mounted within each of these slots is a piezoelectric element or stack.

In operation, the stacked piezoelectric elements expand and contract within the slots and act upon the levers in such a manner that a wave is generated in the stator. As with existing piezoelectric wave motors, the crests of the wave move in an elliptical motion such that a tangential force is created at the wave crests. As the wave crests contact the rotor, the tangential force causes movement of the rotor to thereby drive the piezoelectric motor. Wave motion in typical piezoelectric wave motors is a travelling wave, however the present invention also includes standing wave motors producing an elliptical motion at the crests of the waves.

The piezoelectric motor of the present invention is described below with regard to several specific embodiments of the stator and piezoelectric stack assembly, together referred to as a stator-piezoelectric stack assembly. It should be understood, however, that these embodiments are provided to show the variety of stator and/or piezoelectric stack configurations that can be utilized in a particular application, and are not intended to limit the scope of the present invention.

The present invention will be better understood from the following description of the invention, read in connection with the drawings described below.

DESCRIPTION OF THE DRAWINGS

FIG. 2B also shows the wiring configuration for the stator and piezoelectric stacks.

FIG. 8 is a fragmentary perspective view of another alternative embodiment of the stator-piezoelectric stack assembly of the present invention, wherein end caps attached to the end surfaces of the piezoelectric stacks are utilized to screw the piezoelectric stacks into levers on the bottom surface of the stator.

FIG. 9 is a fragmentary perspective view of another alternative embodiment of the stator-piezoelectric stack assembly of the present invention, wherein end caps attached to the end surfaces of the piezoelectric stacks are screwed into levers on the bottom surface of the stator with a pair of side screws.

FIG. 10 is a fragmentary perspective view of another alternative embodiment of the stator-piezoelectric stack assembly of the present invention, wherein end caps attached to the end surfaces of the piezoelectric stacks are utilized to fit the piezoelectric stacks into dimples formed in levers on the bottom surface of the stator.

FIG. 11 is a fragmentary side view of another alternative embodiment of the stator-piezoelectric stack assembly of the present invention, wherein the piezoelectric stacks are fixedly attached between the teeth on the top surface of the stator.

FIG. 12 is a fragmentary side view of another alternative embodiment of the stator-piezoelectric stack assembly of the present invention, wherein thin bar-shaped piezoelectric elements are stacked on top of each other and fixedly attached between levers on the bottom surface of the stator.

DETAILED DESCRIPTION

Figure 1:
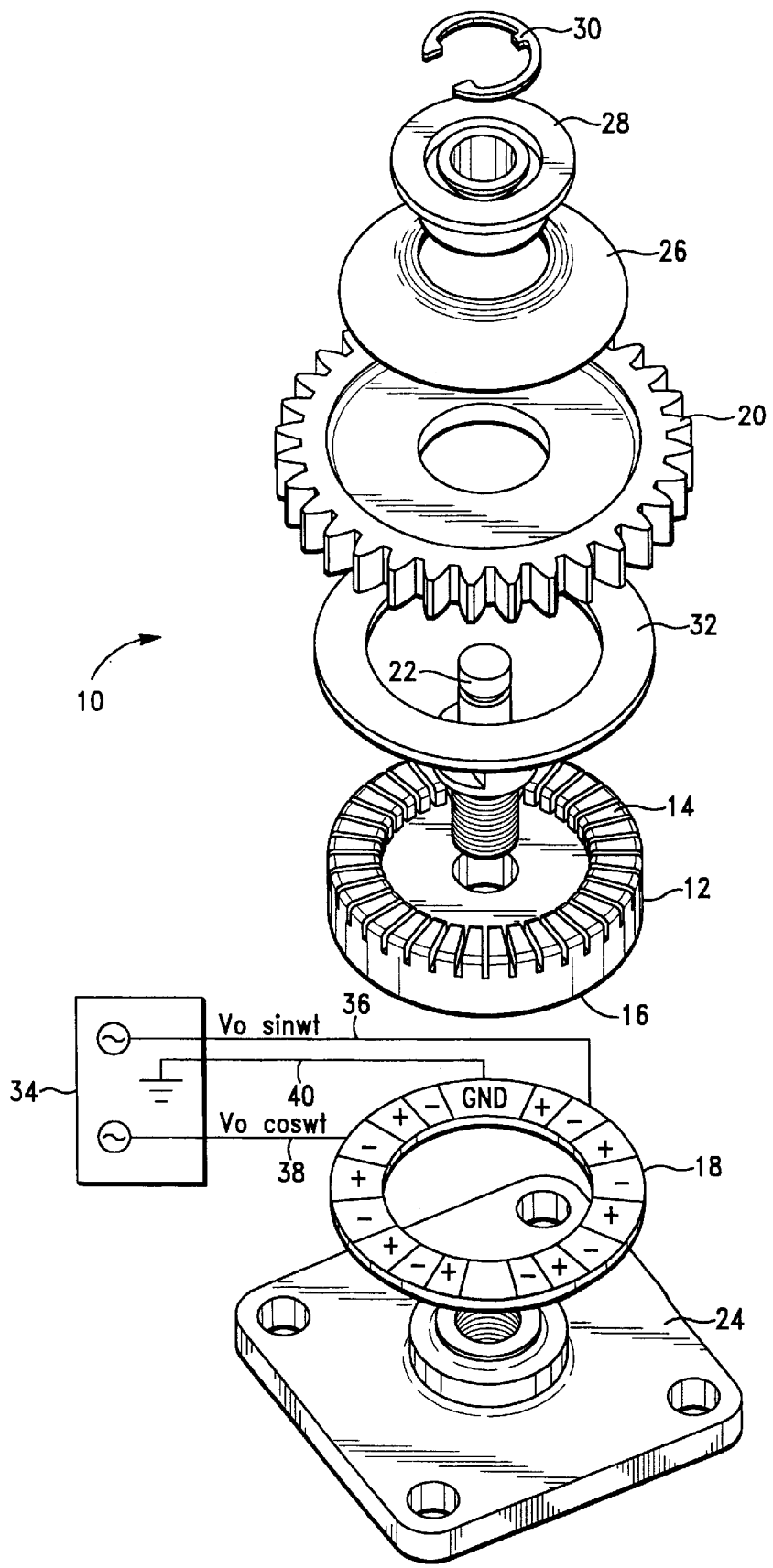
FIG. 1 is an exploded perspective view of an existing rotary piezoelectric motor.
Figure 2A:
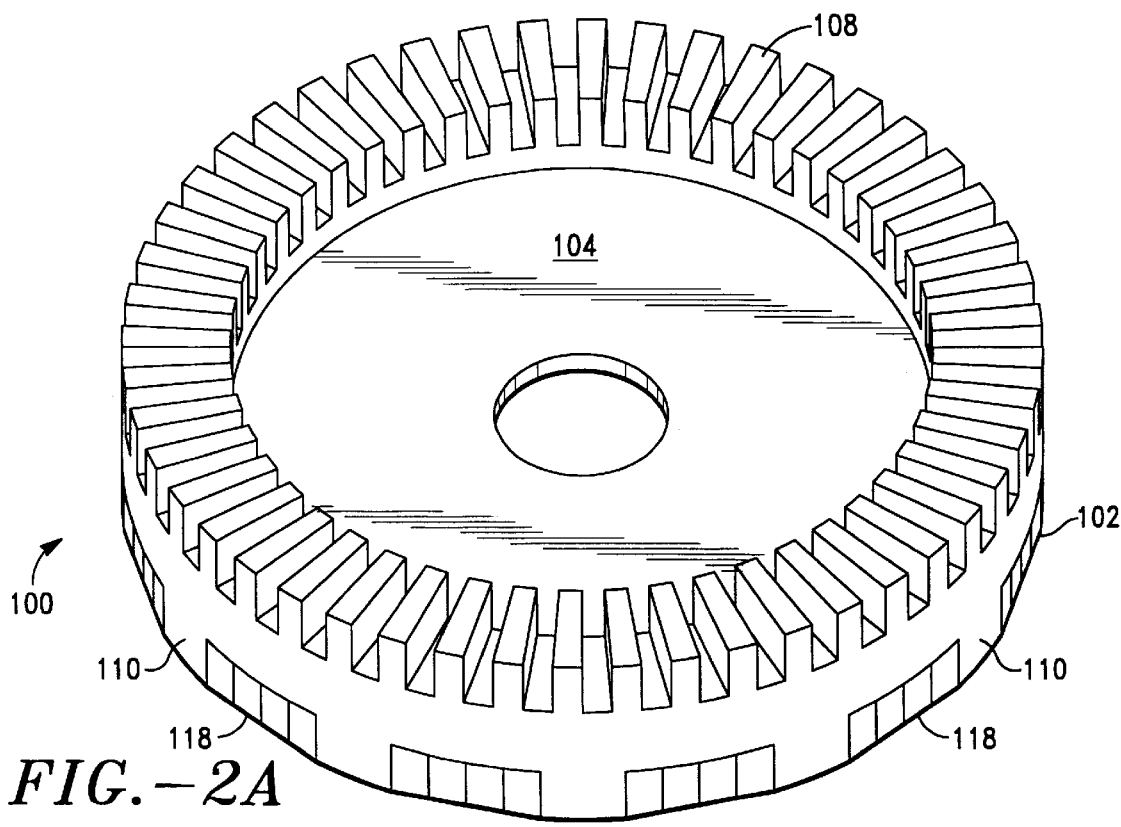
FIGS. 2A and 2B are perspective views of a first embodiment of a stator-piezoelectric stack assembly of the present invention, shown from the rotor side, conveniently referred to as "upright" and inverted positions respectively, wherein the piezoelectric stacks are fixedly attached between inwardly tapering levers on the bottom surface of the stator.
Figure 2B:
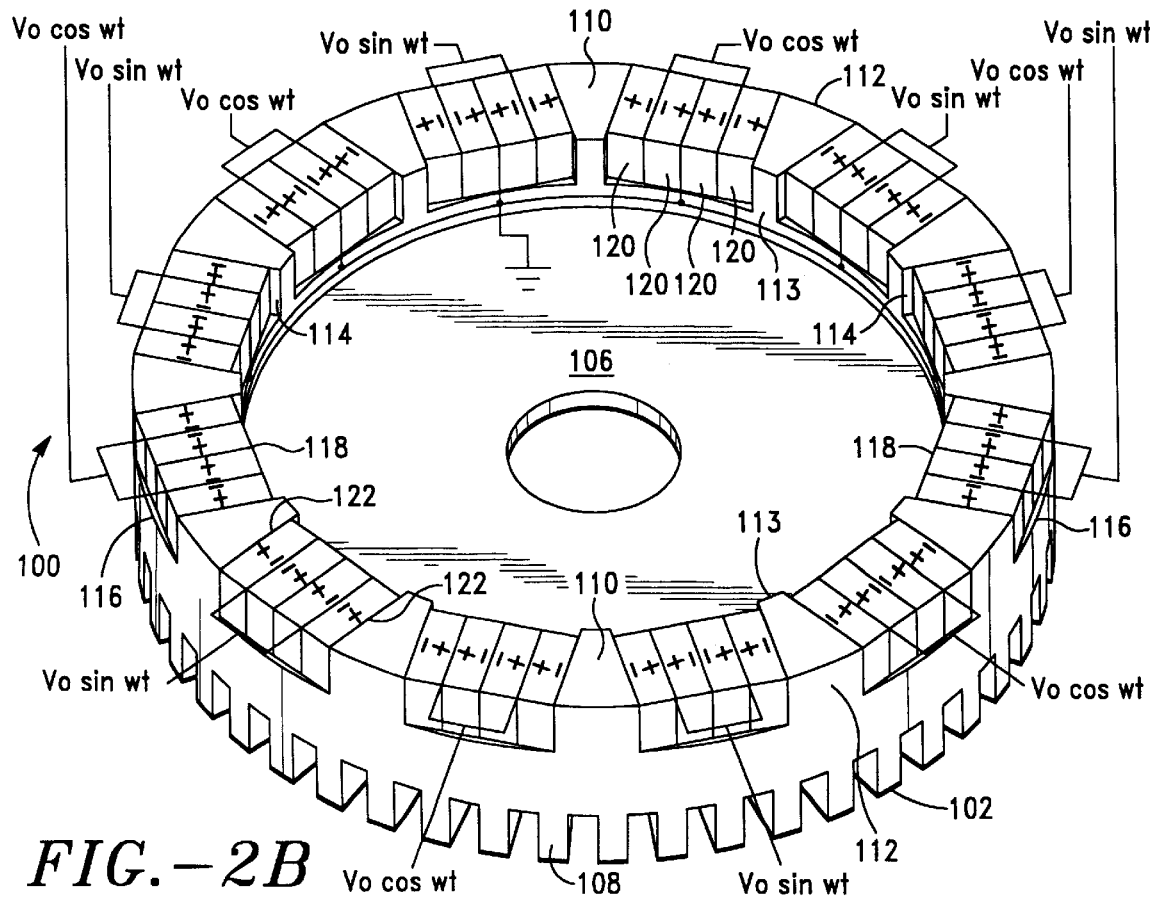

Referring to FIGS. 2A and 2B, an embodiment of the stator-piezoelectric stack assembly is designated generally as reference numeral 100, wherein FIG. 2A illustrates assembly 100 in its original upright position and FIG. 2B illustrates assembly 100 in an inverted position.

Assembly 100 includes a disk-shaped stator 102 having a generally circular top surface 104 (see FIG. 2A) and a generally circular bottom surface 106 (see FIG. 2B). Cut into top surface 104 of stator 102 are a plurality of comb-like teeth 108 which are uniformly dispersed around and extend upwardly from the periphery of top surface 104. As is known in the art, teeth 108 function to amplify the traveling wave generated in stator 102 during the operation of the piezoelectric motor. Similarly, projecting from the bottom surface 106 of stator 102 are a plurality of levers 1 10 which are uniformly dispersed around and extend downwardly from the periphery of bottom surface 106. In this embodiment, levers 110 taper inwardly from an outer surface 112 to an inner surface 113 such that the sidewalls 114 of levers 110 define a plurality of slots 116 between the levers 110 which have a constant width. Stator 102 can be formed of any material with low frictional damping losses, and is preferably a conductive metal such as titanium alloy, stainless steel or phosphor bronze. The stator may advantageously also be formed of a shape memory alloy so as to facilitate compressive preloading of the piezoelectric stack assemblies.

Assembly 100 also includes a plurality of piezoelectric stacks 118, each of which consists of identical piezoelectric elements 120, typically cube-shaped, which have been stacked together and tightly pressed into slots 116 between levers 110 of stator 102. By pressing piezoelectric stacks 118 between levers 110, an initial compressive stress is induced in piezoelectric elements 120 to prevent them from experiencing tensile stresses during operation of the piezoelectric motor. Although the friction fit between piezoelectric stacks 118 and levers 110 would likely secure stacks 118 in place, stacks 118 are preferably captured between levers 110 by epoxy bonding, soldering, diffusion bonding, or otherwise fixedly attaching the end surfaces 122 of piezoelectric stacks 118 to sidewalls 114 of levers 110. Piezoelectric elements 120 can be formed of any piezoelectric material, and are preferably formed of PZT (i.e. any material that is created from $Pb(Zr-Ti)O_3$).

The number of piezoelectric stacks mounted between the levers of the stator is generally equal to four times the number of wavelengths chosen for the traveling wave generated in the stator (i.e. the number of contact points upon which the rotor rests). For example, in the embodiment illustrated in FIG. 2B, twelve piezoelectric stacks 118 will generate a three-wavelength traveling wave in stator 102 (i.e. three contact points upon which the rotor rests). For stability reasons, it is generally preferred to have at least a three-wavelength motor; however, there is no particular maximum number of wavelengths, which could be utilized in accordance with the present invention. Rather, the number of wavelengths chosen for a particular embodiment would be determined by a number of design factors which are familiar to one skilled in the art.

In addition, any number, preferably an even number, of individual piezoelectric elements can be stacked together to form a piezoelectric stack. In the embodiment illustrated in FIG. 2B, four individual piezoelectric elements 120 are stacked together and, preferably, tightly pressed between levers 110 of stator 102. As is known in the art, the voltage required to drive a piezoelectric motor is directly proportional to the thickness of the individual piezoelectric elements. In this regard, it may be preferable to use a larger number of thin piezoelectric elements so that a lower driving voltage can be used. However, a larger number of piezoelectric elements results in a larger number of electrical leads needed to connect the elements to a drive source. Therefore, the optimum number of individual piezoelectric elements chosen for a particular embodiment must balance the voltage requirements against the complexity of the wiring configuration.

Looking again to FIG. 2B, piezoelectric stacks 118 have been electrically poled along an axis of poling which is perpendicular to sidewalls 114 of levers 110. In the illustrated embodiment, two piezoelectric stacks 118 having the same polarity are followed by two piezoelectric stacks having the opposite polarity, wherein the "+" and "−" signs designate the direction of poling for each individual piezoelectric element 120. It should be noted that the poling of piezoelectric elements 120 is preferably done before elements 120 are stacked together and pressed between levers 110 of stator 102.

As with existing rotary piezoelectric motors, a high frequency a.c. voltage source (which consists of two a.c. voltage signals having a 90° phase shift between the signals) is provided to drive the piezoelectric motor. As illustrated in FIG. 2B, a first a.c. voltage signal (typically $V_o \sin \omega t$) and a second a.c. voltage signal ($V_o \cos \omega t$) are applied to piezoelectric stacks 118 in an alternating manner such that every other stack is connected to $V_o \sin \omega t$ and every other stack is connected to $V_o \cos \omega t$. These signals preferably are applied to a thin metallization layer placed between the first/second and third/fourth elements of each piezoelectric stack 118. In addition, it should be noted that stator 102 is electrically grounded, and piezoelectric elements 120 are grounded to stator 102 by connecting the appropriate leads and end surfaces of each piezoelectric stack 118 to stator 102.

It should be apparent that all of the piezoelectric stacks which have the same polarity and are driven by the same a.c. voltage signal will expand and contract together during operation of the piezoelectric motor. In other words, all of the stacks which have a positive polarity and are driven by $V_o \sin \omega t$ will expand and contract together, all of the piezoelectric stacks which have a positive polarity and are driven by $V_o \cos \omega t$ will expand and contract together, all of the piezoelectric stacks which have a negative polarity and are driven by $V_o \sin \omega t$ will expand and contract together, and all of the piezoelectric stacks which have a negative polarity and are driven by $V_o \cos \omega t$ will expand and contract together.

In operation, these alternating expansions and contractions cause piezoelectric stacks 118 to press against levers 110 in such a manner that a wave is generated in stator 102. As with existing piezoelectric wave motors, the crests of the wave generated in stator 102 move in an elliptical motion such that a tangential force is created at the wave crests. As the wave crests contact the rotor, the tangential force causes movement of the rotor to thereby drive the piezoelectric motor.

Significantly, the embodiment of the stator-piezoelectric stack assembly described and illustrated above overcomes all of the above-cited shortcomings associated with existing rotary piezoelectric motors.

First, piezoelectric stacks 118 may be pressed between levers 110 such that an initial compressive stress is induced in piezoelectric elements 120. Thus, when a piezoelectric stack 118 contracts during operation of the piezoelectric motor, the initial compressive stress in piezoelectric elements 120 will reduce the magnitude of tension experienced in the element. If sufficiently pre-compressed, elements 120 will never go into tension. As such, the reliability and life span of the piezoelectric motor will substantially increase.

Second, piezoelectric elements 120 may be electrically poled along an axis of poling which is perpendicular to sidewalls 114 of levers 110. And, the expansions and contractions of piezoelectric elements 120 which are parallel to the axis of poling (i.e. in the $d_{33}$ direction) are utilized to act upon sidewalls 114 of levers 110 to generate a traveling wave in stator 102. Therefore, the piezoelectric properties of piezoelectric elements 120 may be more fully utilized.

Third, piezoelectric stacks 118 act upon levers 110 either directly or through an axial compression of the bond between end surfaces 122 of stacks 118 and sidewalls 114 of levers 110. This method of translating force from piezoelectric stacks 118 to stator 102 is much more efficient than the shear loading of the bond of existing motors and, as such, the reliability and life span of the piezoelectric motor will substantially increase.

Figure 3:
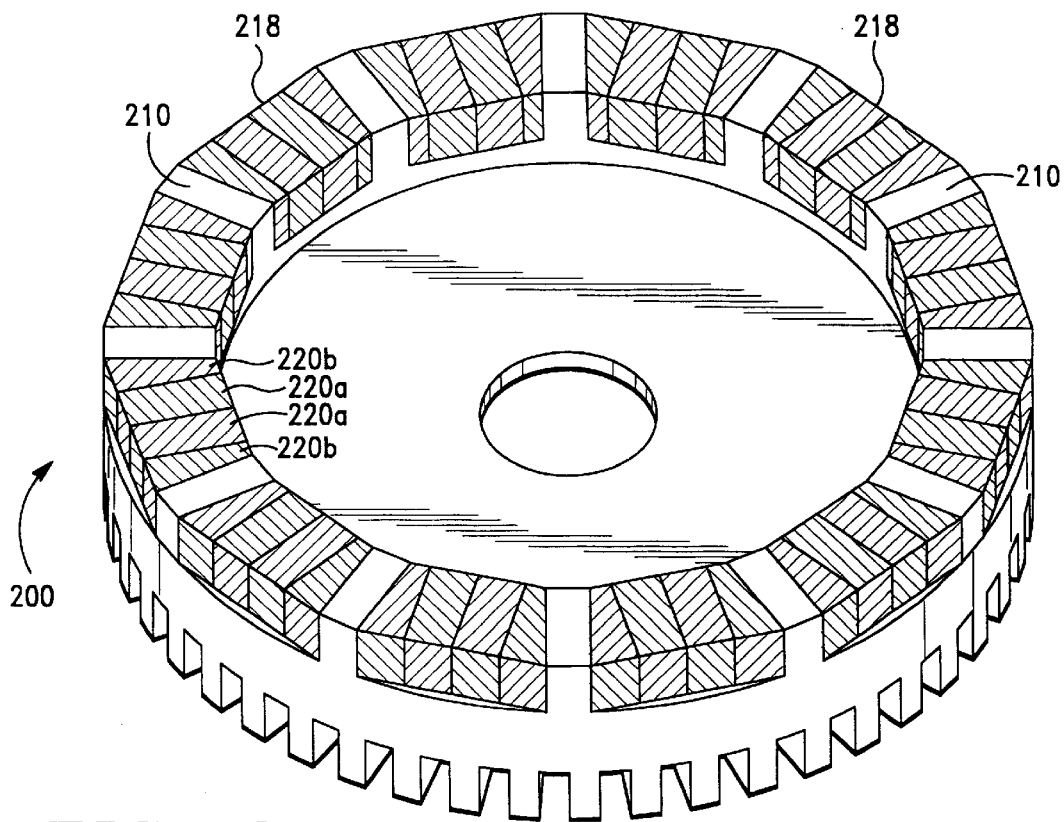
FIG. 3 is a perspective view of an alternative embodiment of the stator-piezoelectric stack assembly of the present invention, shown in the inverted position, wherein the piezoelectric stacks are fixedly attached between untapered levers on the bottom surface of the stator.
Figure 4:
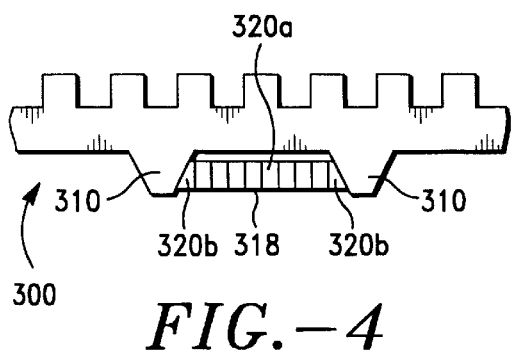
FIG. 4 is a fragmentary side view of another alternative embodiment of the stator-piezoelectric stack assembly of the present invention, wherein the piezoelectric stacks are fixedly attached between downwardly tapering levers on the bottom surface of the stator.
Figure 5:
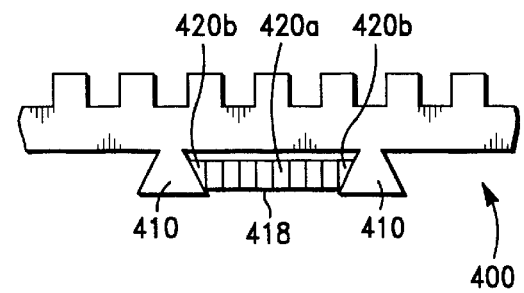
FIG. 5 is a fragmentary side view of another alternative embodiment of the stator-piezoelectric stack assembly of the present invention, wherein the piezoelectric stacks are fixedly attached between upwardly tapering levers on the bottom surface of the stator.

Various alternative embodiments of the stator-piezoelectric stack assembly of the present invention are illustrated in FIGS. 3–12. Specifically, FIGS. 3–5 illustrate alternative embodiments in which the inwardly tapering levers of the embodiment shown in FIG. 2 have been replaced with other lever configurations, FIGS. 6–10 illustrate alternative embodiments in which end caps are attached to the end surfaces of the piezoelectric stacks, FIG. 11 illustrates an alternative embodiment in which the stator of the embodiment shown in FIG. 2 has been replaced with a stator having the same design as that of existing rotary piezoelectric motors, and FIG. 12 illustrates an alternative embodiment in which the cube-shaped piezoelectric elements of the embodiment shown in FIG. 2 have been replaced with thin bar-shaped piezoelectric elements which have been stacked on top of each other and pressed between the levers of the stator. Unless otherwise noted, all of these alternative embodiments overcome the above-cited shortcomings associated with existing rotary piezoelectric motors.

Referring to FIG. 3, a first alternative embodiment of the stator-piezoelectric stack assembly, illustrated in an inverted position, is designated generally as reference numeral 200. Assembly 200 has the same design as assembly 100 of the embodiment shown in FIG. 2, with the exception that inwardly tapering levers 110 have been replaced with levers 210 which are not tapered (i.e. have a constant width) and piezoelectric stacks 118 have been replaced with inwardly tapering piezoelectric stacks 218. In the embodiment illustrated in FIG. 3, each piezoelectric stack 218 consists of two identical inner cube-shaped piezoelectric elements 220a and two inwardly tapering outer piezoelectric elements 220b which are stacked together and tightly pressed between levers 210.

Referring to FIG. 4, a fragmentary view of a second alternative embodiment of the stator-piezoelectric stack assembly is designated generally as reference numeral 300. Assembly 300 has the same design as assembly 100 of the embodiment shown in FIG. 2, with the exception that inwardly tapering levers 110 have been replaced with downwardly tapering levers 310 and piezoelectric stacks 118 have been replaced with upwardly tapering piezoelectric stacks 318. In the illustrated embodiment, each piezoelectric stack 318 consists of eight identical inner cube-shaped piezoelectric elements 320a and two upwardly tapering outer piezoelectric elements 320b which are stacked together and tightly pressed between levers 310.

Referring to FIG. 5, a fragmentary view of a third alternative embodiment of the stator-piezoelectric stack assembly is designated generally as reference numeral 400. The design of assembly 400 is simply an inversion of the design of assembly 300 illustrated in FIG. 4, wherein downwardly tapering piezoelectric stacks 418 are tightly pressed between upwardly tapering levers 410. In the illustrated embodiment, each piezoelectric stack 418 consists of eight identical inner cube-shaped piezoelectric elements 420a and two downwardly tapering outer piezoelectric elements 420b which are stacked together and tightly pressed between levers 410.

Figure 6:
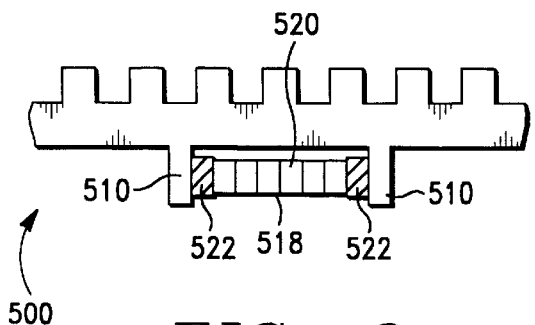
FIG. 6 is a fragmentary side view of another alternative embodiment of the stator-piezoelectric stack assembly of the present invention, wherein flat end caps attached to the end surfaces of the piezoelectric stacks are utilized to fixedly attach the piezoelectric stacks between levers on the bottom surface of the stator.

Referring to FIG. 6, a fragmentary view of a fourth alternative embodiment of the stator-piezoelectric stack assembly is designated generally as reference numeral 500. Assembly 500 has the same design as assembly 100 of the embodiment shown in FIG. 2, with the exception that piezoelectric stacks 118 have been replaced with piezoelectric stacks 518 which have flat metal end caps 522 fixedly attached to the end surfaces of the stacks 518. In the illustrated embodiment, each piezoelectric stack 518 consists of six identical inner piezoelectric elements 520 and two flat end caps 522 which are stacked together and tightly pressed between levers 510. End caps 522 can be formed of any rigid material known in the art, and are preferably formed of a low damping metal commonly used in piezoelectric motor stator and rotor applications, such as phosphor-bronze and titanium alloys. In addition, end caps 522 could be formed of a shape memory alloy which would allow piezoelectric stacks 518 to be tightly fitted between levers 510.

Figure 7:
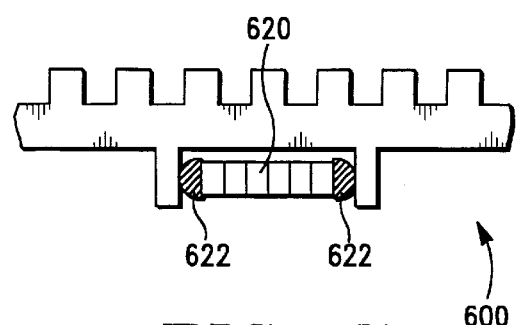
FIG. 7 is a fragmentary side view of another alternative embodiment of the stator-piezoelectric stack assembly of the present invention, wherein rounded end caps attached to the end surfaces of the piezoelectric stacks are utilized to fixedly attach the piezoelectric stacks between levers on the bottom surface of the stator.

Referring to FIG. 7, a fragmentary view of a fifth alternative embodiment of the stator-piezoelectric stack assembly is designated generally as reference numeral 600. Assembly 600 has the same design as assembly 500 illustrated in FIG. 6, with the exception that each of the piezoelectric elements 620 has a generally disk shape (see FIG. 8–10) and both of the end caps 622 are rounded. Of course, other end cap configurations (e.g. tapered or chamfered) could also be used in accordance with the present invention.

Referring to FIG. 8, a fragmentary view of a sixth alternative embodiment of the stator-piezoelectric stack assembly is designated generally as reference numeral 700. Assembly 700 has the same design as assembly 600 illustrated in FIG. 7, with the exception that threaded extensions 724 projecting outwardly from the end caps 722 are utilized to screw piezoelectric stacks 718 into corresponding holes formed in the levers 710. It should be noted that assembly 700 is expected to be particularly well-suited for larger-size piezoelectric motors.

Referring to FIG. 9, a fragmentary view of a seventh alternative embodiment of the stator-piezoelectric stack assembly is designated generally as reference numeral 800. Assembly 800 has the same design as assembly 700 illustrated in FIG. 8, with the exception that the extensions 824 projecting outwardly from end caps 822 are configured to be inserted into slots 826 formed in the levers 810. To secure piezoelectric stacks 818 to levers 810, a pair of threaded side screws 828 are provided which can be screwed through holes 830 formed in extensions 824 and into corresponding holes 832 formed in levers 810. Again, assembly 800 is expected to be particularly well-suited for larger-size piezoelectric motors.

Referring to FIG. 10, a fragmentary view of an eighth alternative embodiment of the stator-piezoelectric stack assembly is designated generally as reference numeral 900. Assembly 900 has the same design as assembly 700 illustrated in FIG. 8, with the exception that the extensions 824 projecting outwardly from end caps 922 are configured to be fitted within dimples formed in the sidewalls 914 of levers 910. As such, piezoelectric stacks 918 are securely held in place between levers 910. Again, assembly 900 is expected to be particularly well-suited for larger-size piezoelectric motors.

Referring to FIG. 11, a fragmentary view of a ninth alternative embodiment of the stator-piezoelectric stack assembly is designated generally as reference numeral 1000. Assembly 1000 includes a stator 1002 which has the same design as the stators of existing rotary piezoelectric motors, namely, a comb-tooth top surface 1004 and a flat bottom surface 1006. A plurality of piezoelectric stacks 1018 are mounted between the teeth 1008 on top surface 1004 of stator 1002, wherein teeth 1008 function in the same manner as the levers on the bottom surface of the stators described above. In the illustrated embodiment, each piezoelectric stack 1018 consists of two identical piezoelectric elements 1020 which are stacked together and tightly pressed between teeth 1008.

Figure 13:
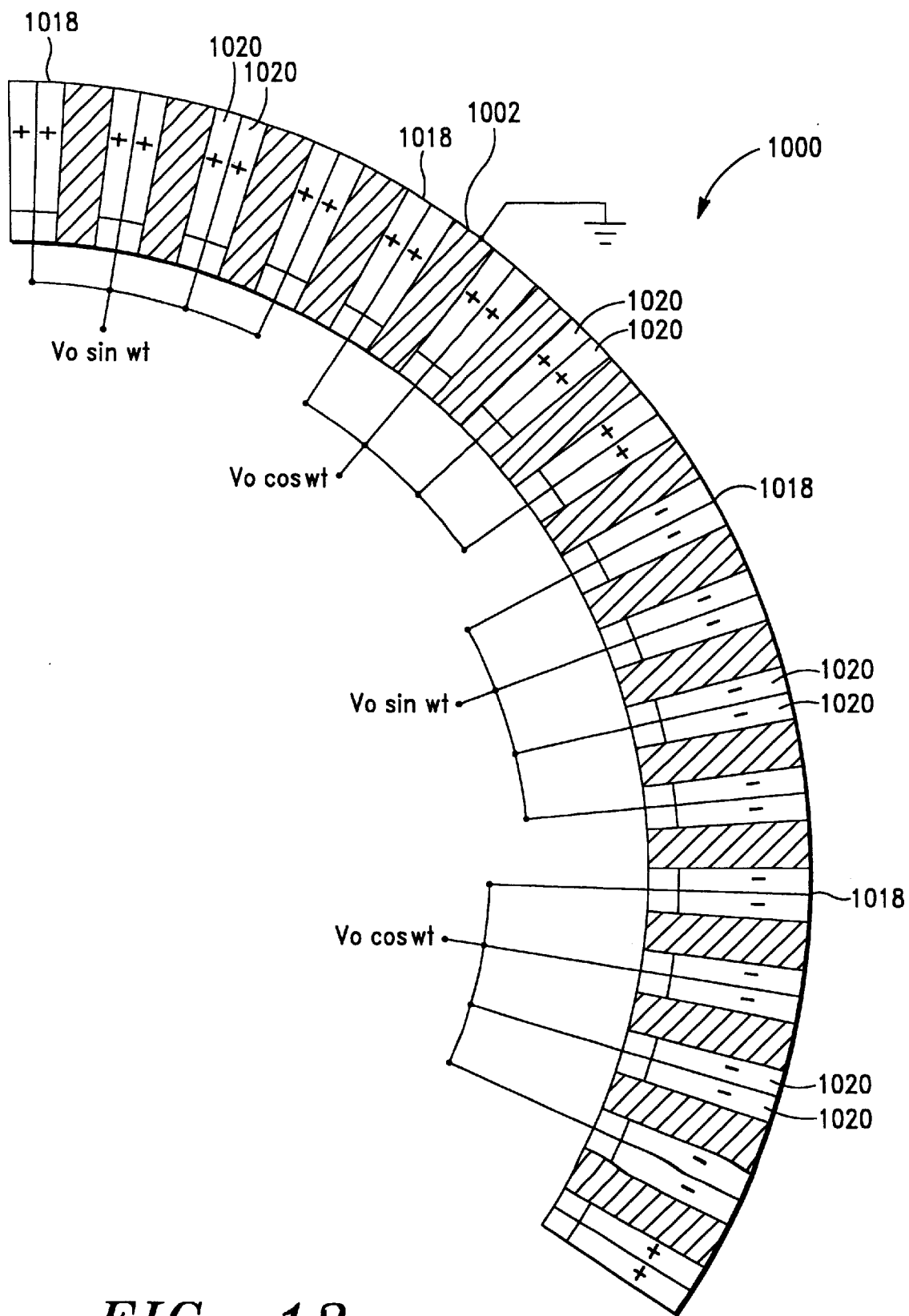
FIG. 13 is a partial top view of a typical wiring configuration for the stator-piezoelectric stack assembly of FIG. 11.

FIG. 13 illustrates a typical wiring configuration for a one-third section of assembly 1000. Piezoelectric stacks 1018 are divided into four-stack sections such that two sections having a positive polarity (as indicated by the "+" sign) are followed by two sections having a negative polarity (as indicated by the "−" sign). A first a.c. voltage signal (typically $V_o \sin \omega t$) and a second a.c. voltage signal ($V_o \cos \omega t$) are applied to the four-stack sections in an alternating pattern such that every other section is connected to $V_o \sin \omega t$ and every other section is connected to $V_o \cos \omega t$. As in the embodiment shown in FIG. 2, stator 1002 is electrically grounded, and piezoelectric elements 1020 are grounded to stator 1002 by connecting the end surfaces of each piezoelectric stack 1018 to stator 1002. It should be noted that a number of schemes are known in the art to produce the voltage signals to drive these piezoelectric wave motors. The specific schemes need not be discussed here.

Referring to FIG. 12, a fragmentary view of a tenth alternative embodiment of the stator-piezoelectric stack assembly is designated generally as reference numeral 100. Assembly 1100 has the same design as assembly 100 of the embodiment shown in FIG. 2, with the exception that the individual cube-shaped piezoelectric elements 120 have been replaced with thin bar-shaped piezoelectric elements 1120 which are stacked on top of each other and tightly pressed between the levers 1110 of the stator 1102. Piezoelectric elements 1120 are preferably captured between levers 1110 by epoxy bonding, soldering, diffusion bonding, or otherwise fixedly attaching the end surfaces of piezoelectric elements 1120 to the sidewalls of levers 1110. In this embodiment, however, the expansions and contractions of piezoelectric elements 1120 which are transverse to the element's axis of poling (i.e. in the $d_{31}$ direction) are utilized to generate a traveling wave in stator 1102.

It is also noted that a schemes for driving piezoelectric motors, similar to the travelling wave embodiments shown here, have been developed using standing waves, but with stator tooth configuration and element placement configured to produce elliptical motion in the teeth to drive the rotor. As would be apparent to one skilled in the art, the present invention is adapted to be utilized in such standing wave motors.

Further, although rotary piezoelectric motors are the most common form of piezoelectric wave motors and the above embodiments show rotary piezoelectric wave motors, it is known that linear and other non-circular shapes piezoelectric motors may use wave motion to drive a rotor. Such motors include continuous loop motors as well as linear motors without a return loop. The present invention, including the unique stator and piezoelectric stack assemblies disclosed, are applicable to the various non-rotary piezoelectric wave motor designs utilizing non-circular stators and rotors.

Finite Element Analysis

In order to verify that the expansions and contractions of the piezoelectric stacks will generate a traveling wave in the stator of the rotary piezoelectric motor of the present invention, a computer simulation in the form of a finite element analysis (FEA) was performed to simulate the amount of deflection in various beams, which will be described below. FIGS. 14, 15 and 16 illustrate beams which were designed in accordance with existing rotary piezoelectric motors, and FIG. 17 illustrates a beam which was designed in accordance with the rotary piezoelectric motor of the present invention.

Figures 14A, 14B:
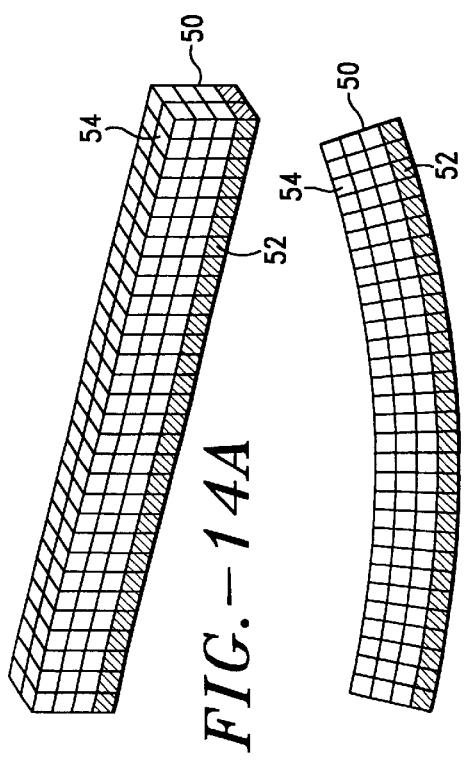

FIGS. 14A and 14B simulate an existing rotary piezoelectric motor, wherein a thin piezoelectric element ring is bonded to the bottom surface of a stator. Specifically, FIG. 14A is an FEA plot of a beam 50 consisting of 1 row by 2 columns of piezoelectric ceramic material 52 (i.e. 60 "cubes") bonded to the bottom of 3 rows by 2 columns of stator material 54 (i.e. 180 "cubes"). When a voltage V was applied across beam 50, it deflected as shown in FIG. 14B. The magnitude of this deflection was 0.380e−1.

Figures 15A, 15B:
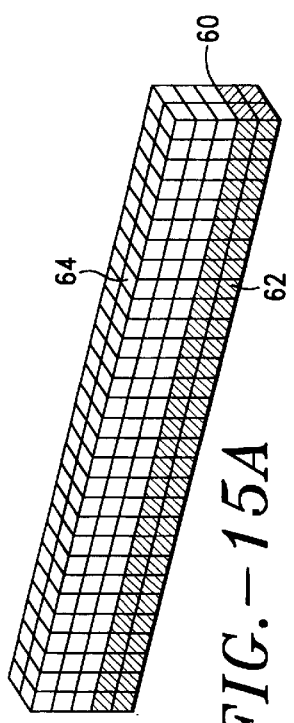
FIGS. 14A and 14B, 15A and 15B, and 16A and 16B are finite-element-analysis plots showing the deflection when various amounts of piezoelectric material are bonded to the bottom surface of a segment of stator material.

FIGS. 15A and 15B simulate an existing rotary piezoelectric motor, wherein a slightly thicker piezoelectric element ring is bonded to the bottom surface of a stator. Specifically, FIG. 15A is an FEA plot of a beam 60 consisting of 2 rows by 2 columns of piezoelectric element material 62 (i.e. 120 "cubes") bonded to the bottom of 3 rows by 2 columns of stator material 64 (i.e. 180 "cubes"). When a voltage V was applied across beam 60, it deflected as shown in FIG. 15B. The magnitude of this deflection was 0.433e−1. Thus, even though beam 60 utilized twice as much piezoelectric element material as beam 50, there was only a marginal increase in deflection.

Figures 16A, 16B:
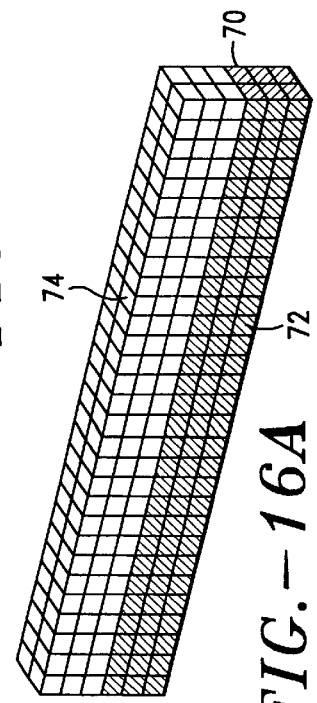

FIGS. 16A and 16B simulate an existing rotary piezoelectric motor, wherein an even thicker piezoelectric element ring is bonded to the bottom surface of a stator. Specifically, FIG. 16A is an FEA plot of a beam 70 consisting of 3 rows by 2 columns of piezoelectric element material 72 (i.e. 180 "cubes") bonded to the bottom of 3 rows by 2 columns of stator material 74 (i.e. 180 "cubes"). When a voltage V was applied across beam 70, it deflected as shown in FIG. 16B. The magnitude of this deflection was 0.398e−1. Thus, even though beam 70 utilized three times as much piezoelectric element material as beam 50, there was only a marginal increase in deflection. And, even though beam 70 utilized one and one-half times as much piezoelectric element material as beam 60, there was actually a decrease in deflection. Therefore, it can be seen that an increase in the amount of piezoelectric element material does not always result in an increase in deflection. In fact, for the existing rotary piezoelectric motor simulations, the optimum amount of piezoelectric element material was that of beam 60.

Figures 17A, 17B:
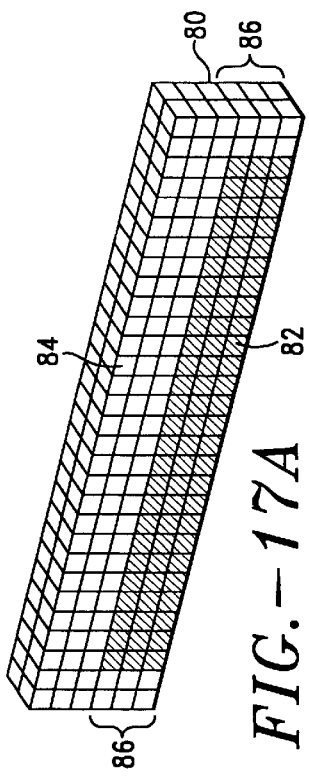
FIGS. 17A and 17B are finite-element-analysis plots showing the deflection when piezoelectric material is bonded between levers extending outwardly from the bottom surface of stator material.

FIGS. 17A and 17B simulate the rotary piezoelectric motor of the present invention, wherein piezoelectric stacks are pressed between levers extending downwardly from the bottom surface of a stator. Specifically, FIG. 17A is an FEA plot of a beam 80 consisting of 3 rows by 2 columns of piezoelectric element material 82 (i.e. 156 "cubes") bonded to the bottom of 3 rows by 2 columns of stator material 84 (i.e. 180 "cubes") and between two "levers" of 3 rows by 2 columns of stator material 86 (i.e. 12 "cubes" per lever).

When a voltage V was applied across beam 80, it deflected as shown in FIG. 17B. The magnitude of this deflection was 0.857e−1. Thus, even though beam 80 utilized less piezoelectric element material than beam 70, the deflection of beam 80 more than doubled. As a result, it is anticipated that the rotary piezoelectric motor of the present invention will be capable of generating substantially more torque than existing piezoelectric motors, due in large part to the utilization of the expansions and contractions of the individual piezoelectric elements in the $d_{33}$ direction. Of course, as with the design of existing rotary piezoelectric motors, there will be an optimum amount of piezoelectric element material which will generate the greatest deflection in beam 80.

Although the rotary piezoelectric motor of the present invention has been described and illustrated with regard to specific embodiments, it should be understood that various modifications of the stator and/or piezoelectric stack design are possible without departing from the scope of the present invention. Therefore, the present invention is not to be limited to these embodiments, except insofar as such limitations are included in the following claims.

What is claimed is:

1. A rotary piezoelectric motor comprising:
   (a) a disk-shaped stator having:
      (i) a generally circular top surface with a plurality of teeth dispersed around and projecting upwardly from the periphery of the top surface; and
      (ii) a generally circular bottom surface with a plurality of levers dispersed around and projecting downwardly along the periphery of the bottom surface, which levers define a plurality of slots;
   (b) a plurality of piezoelectric stacks which have been electrically poled along an axis of poling and fixedly mounted within the slots on the bottom surface of the stator;
   (c) a disk-shaped rotor having a generally circular bottom surface held in pressure contact with the teeth on the top surface of the stator; and
   (d) a drive source coupled to the piezoelectric stacks for inducing expansions and contractions of the stacks within the slots; wherein expansions and contractions of the piezoelectric stacks parallel to the axis of poling act upon the levers to generate a traveling wave in the stator and thereby drive the rotor of the piezoelectric motor; and wherein the levers hold the piezoelectric stacks in compression to prevent the stacks from experiencing tensile stresses during operation of the piezoelectric motor.

* * * * *